United States Patent
Bushey (10) Patent No.: US 7,802,939 B2
(45) Date of Patent: Sep. 28, 2010

(54) HIGH AXIAL STIFFNESS SWIVEL JOINT

(75) Inventor: John A. Bushey, Eden Prairie, MN (US)

(73) Assignee: MTS Systems Corporation, Eden Prairie, MN (US)

( * ) Notice: Subject to any disclaimer, the term of this patent is extended or adjusted under 35 U.S.C. 154(b) by 349 days.

(21) Appl. No.: 11/835,264

(22) Filed: Aug. 7, 2007

(65) Prior Publication Data

US 2009/0041534 A1   Feb. 12, 2009

(51) Int. Cl.
 *F16D 3/00* (2006.01)
(52) U.S. Cl. .......................... 403/57; 403/58
(58) Field of Classification Search ............. 403/57, 403/58, 150, 157; 464/14, 114, 119, 134, 464/136
See application file for complete search history.

(56) References Cited

U.S. PATENT DOCUMENTS

| | | | |
|---|---|---|---|
| 420,284 A * | 1/1890 | Schoff | 464/136 |
| 1,143,596 A | 6/1915 | Bockhoff | |
| 1,343,728 A | 6/1920 | Kopf | |
| 1,812,934 A | 7/1931 | Curtis | |
| 2,395,792 A | 2/1946 | Shea | |
| 2,813,409 A * | 11/1957 | Wolcott | 464/113 |
| 2,876,636 A | 3/1959 | Thackeray | |
| 3,044,282 A | 7/1962 | Grundy | |
| 4,318,572 A | 3/1982 | Noha et al. | |
| 5,458,028 A | 10/1995 | Cleveland, III | |
| 5,466,085 A | 11/1995 | Sheldon et al. | |
| 5,649,778 A | 7/1997 | Lin | |
| 5,752,834 A | 5/1998 | Ling | |
| 5,766,081 A | 6/1998 | Desmarais | |
| 6,257,986 B1 | 7/2001 | Duggan et al. | |
| 6,383,081 B1 | 5/2002 | DeBisschop | |
| 6,709,183 B2 * | 3/2004 | Meyer et al. | 403/57 |
| 6,758,623 B2 | 7/2004 | Bushey | |
| 2003/0108379 A1 | 6/2003 | Bushey | |

FOREIGN PATENT DOCUMENTS

| | | |
|---|---|---|
| DE | 19846355 A1 | 4/2000 |
| DE | 10058317 | 5/2001 |
| DE | 102004055391 A1 * | 6/2006 |
| EP | 1198677 B1 * | 12/2003 |
| FR | 2703175 | 9/1994 |
| JP | 52043055 | 4/1977 |
| JP | 2006200612 A * | 8/2006 |

OTHER PUBLICATIONS

Official Search Report of the European Patent Office in counterpart foreign application No. PCT/US2008/009395 filed Aug. 5, 2008.

* cited by examiner

*Primary Examiner*—Victor MacArthur
(74) *Attorney, Agent, or Firm*—Steven M. Koehler; Westman, Champlin & Kelly, P.A.

(57) ABSTRACT

A swivel joint is provided comprising a first base member, a second base member, and a spider positioned between the first and second base members. The spider includes a center support and first and second bearing support elements. Each bearing support element has an arcuate surfaces adapted to form joints with the first and second base members. In one embodiment, at least one shim element disposed is between at least one of the first and second bearing support elements and the center support.

17 Claims, 11 Drawing Sheets

HIGH AXIAL STIFFNESS SWIVEL JOINT

BACKGROUND

The discussion below is merely provided for general background information and is not intended to be used as an aid in determining the scope of the claimed subject matter.

Universal joints are well-known devices that couple members together, yet allow motion in two degrees of freedom. Commonly, the universal joint includes two yokes or devises with a cross or spider member disposed there between. Bearing surfaces on ends of the spider allow relative angular motion about two orthogonal axes.

Universal joints can be used in a variety of different applications. In many instances, the universal joint is used to transfer torque loads between coupled members. However, a universal joint having high axial stiffness for transmitting tension and compression forces would be particularly beneficial for yet other applications. However, current universal joints experience low strength and stiffness in the axial direction due to bending stresses and deflection of the spider. U.S. Pat. No. 6,758,623 to Bushey discloses a high axial stiffness swivel joint that can transmit compressive and tension loads.

SUMMARY

A swivel joint is provided comprising a first base member, a second base member, and a spider disposed between the first and second base members.

The spider includes a center support and first and second bearing support elements. Each bearing support element has an arcuate surfaces adapted to form joints with the first and second base members. In one embodiment, at least one shim element is positioned between at least one of the first and second bearing support elements and the center support.

Another aspect herein described is a swivel joint comprising first and second base members, and a spider positioned between the first and second base members. The spider includes a center support and first and second bearing support elements. Each bearing support element has an arcuate surface adapted to form a joint with one of the first and second base members. A plurality of shafts are adapted to engage the center support and receive a fastener to secure the shaft to the center support. First and second connector assemblies connect the center support to the first base member such that the first base member is rotatable with respect to the center support about a first axis of rotation. Third and fourth connector assemblies connect the center support to the second base member such that the second base member is rotatable with respect to the center support about a second axis of rotation. Each of the connector assemblies is supported on at least one of the shafts.

Yet another aspect herein described is a swivel joint comprising first and second base members and a spider positioned between the first and second base members. The spider includes a center support having at least two surfaces that are substantially planar and opposed from each other. The spider also includes first and second bearing support elements, wherein each bearing support element has an arcuate surface adapted to form a joint with one of the first and second base members. Each bearing support element includes a surface that has substantially planar portions that are adapted to engage one of the planar surfaces of the center support.

These and various other features and advantages will be apparent from a reading of the following Detailed Description using the exemplary embodiment therein described. This Summary and Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

DETAILED DESCRIPTION

Figure 1:
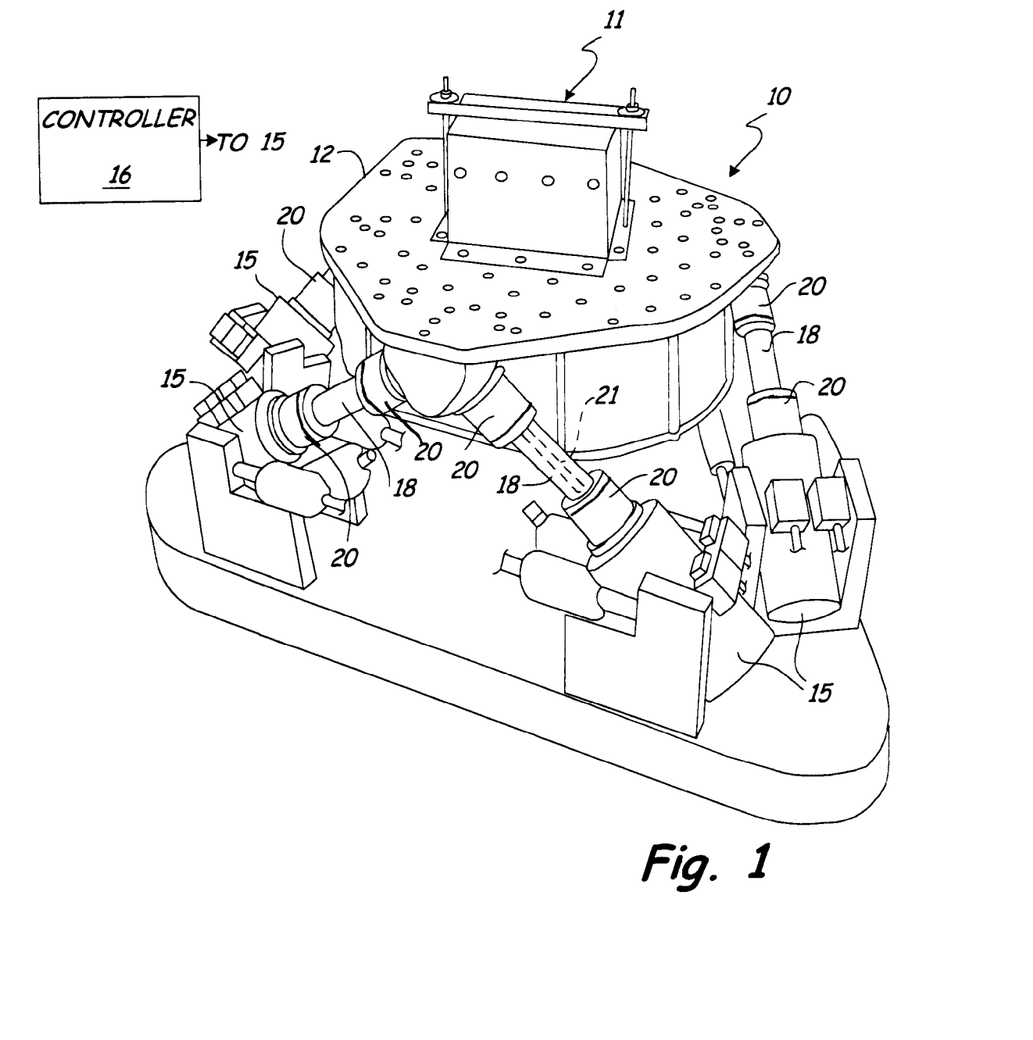
FIG. 1 is a schematic diagram of a simulation system for use with the present invention.

Before describing the swivel joint in detail, an explanation of an exemplary operating environment for the swivel joint and forming another aspect of the invention, may be helpful. FIG. 1 schematically illustrates an exemplary simulation system 10. The system 10 includes a table 12 for supporting a specimen 11 under test and a plurality of actuators 15 for driving the table 12 in response from a system controller 16. Struts 18 are commonly provided to couple the table 12 to each of the actuators 15. In the embodiment illustrated, swivels 20 are provided between the actuators 15 and the struts 18 and the table 12. In the embodiment illustrated, system 10 includes twelve swivels 20, however, it will be appreciated that a swivel 20 can be provided in the system 10 where needed depending upon operating parameters thereof. In one embodiment discussed below, swivels 20 can include hydrostatic bearings where fluid for the bearings can be provided by actuators 15. In addition, struts 18 can be adapted to provide fluid communication between swivels 20 through port 21. Swivels 20 are particularly useful in simulation system 10, where the swivels 20 are used for transmitting forces to a specimen or table proportionate to command inputs from controller 16. In particular, swivels 20 are configured to transmit compression and tension forces with high load capacity, high axial stiffness, and minimized backlash. Other systems can utilize swivel joint 20 including, but not limited to, other actuator assemblies (e.g. hydraulic, pneumatic, electric), robotic mechanisms and machine tools, to name a few.

Figure 2:
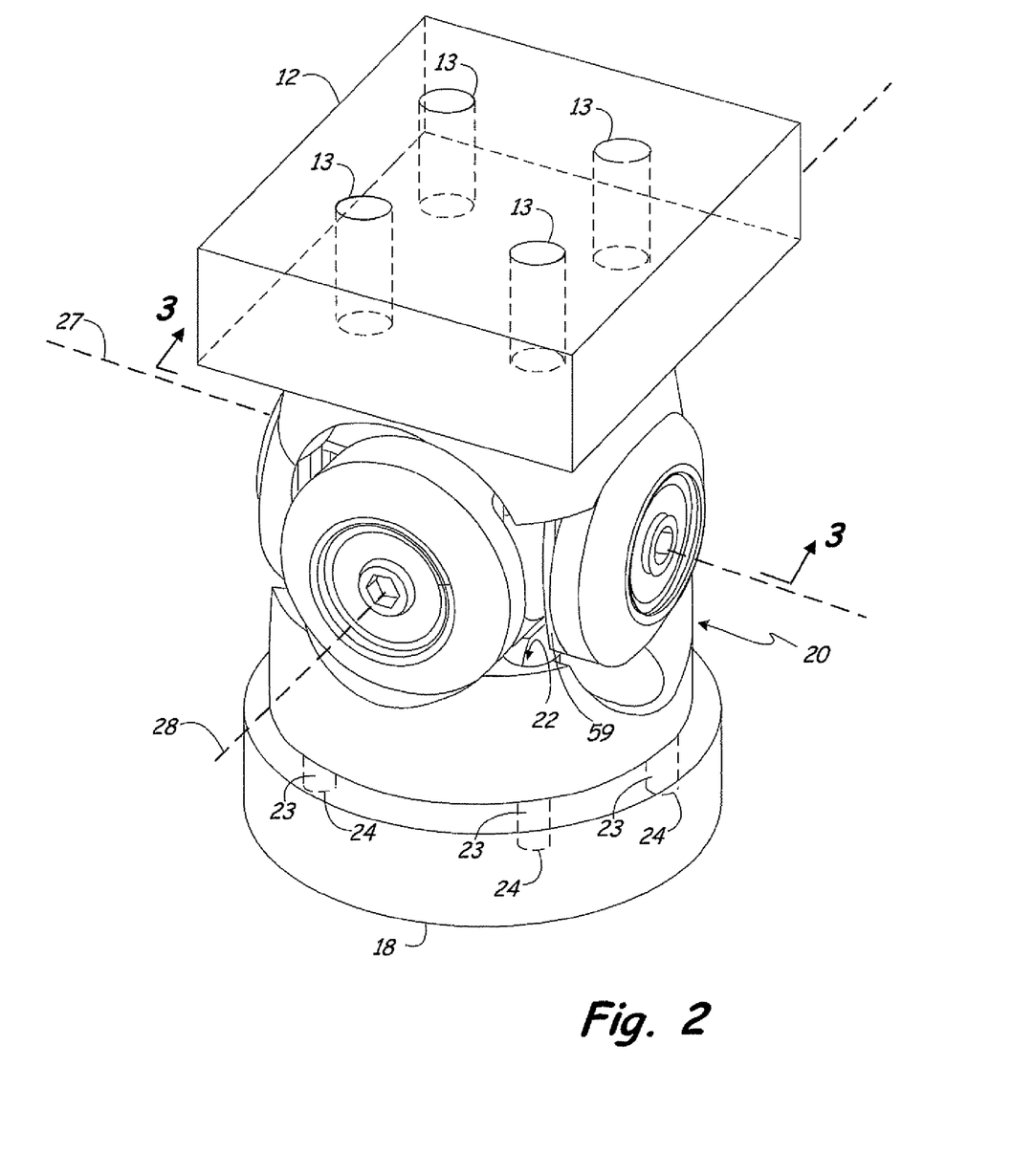
FIG. 2 is a perspective view of a swivel joint in accordance with one embodiment.
Figure 5:
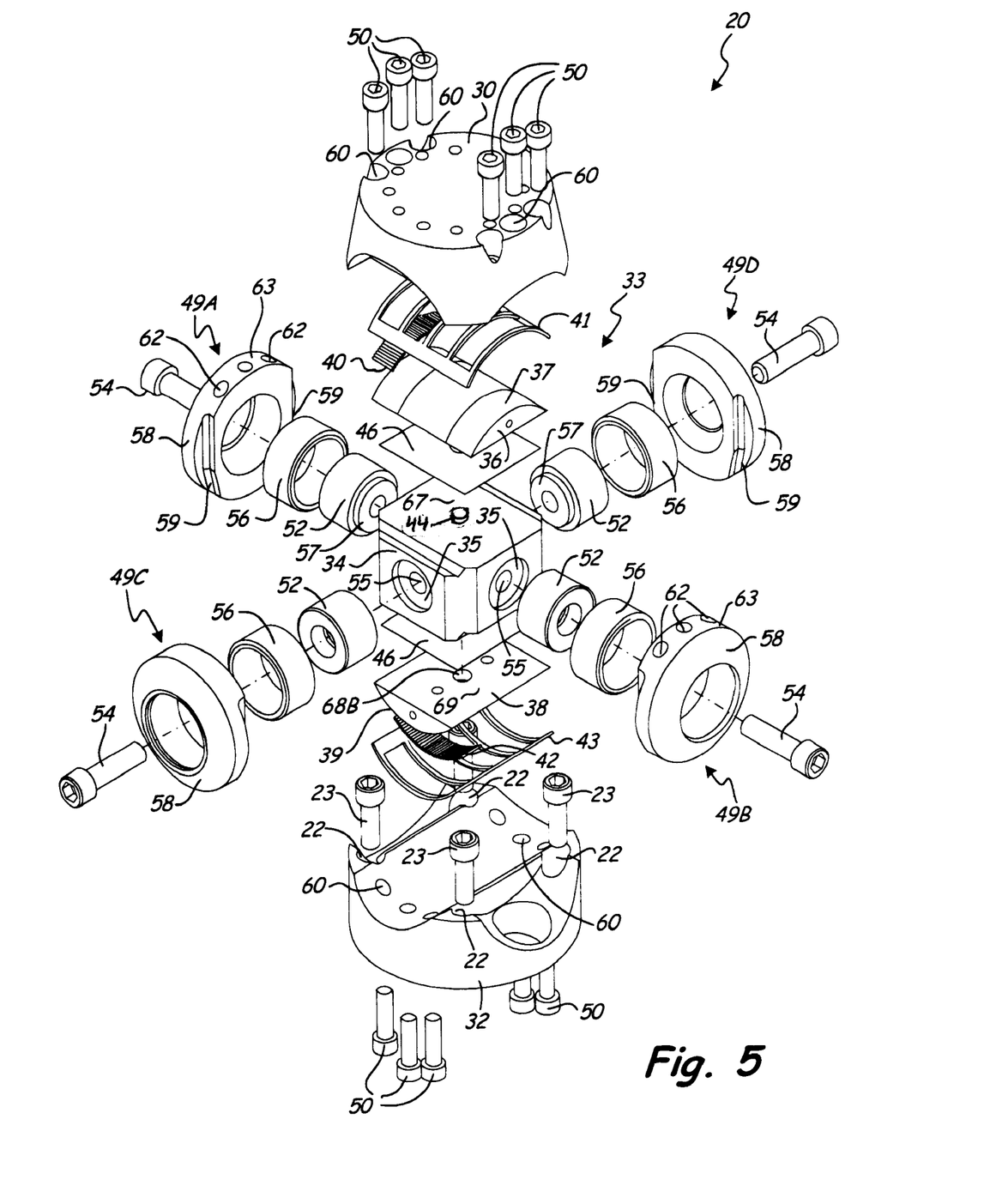
FIG. 5 is an exploded view of the swivel joint of FIG. 4.

FIGS. 2-5 illustrate swivel joint 20 in more detail, and further illustrate multiple ways to secure swivel joint 20 to table 12 and strut 18. As illustrated, swivel joint 20 can be mounted to table 12 by inserting fasteners through apertures 13 formed in table 12. The fasteners engage corresponding apertures 17 (FIG. 4) formed in swivel joint 20. Swivel joint 20 can be mounted to strut 18 using fasteners 23 (FIGS. 2 and 5). Fasteners 23 are inserted through apertures 22 formed in swivel joint 20 (FIGS. 2 and 5) and engage corresponding apertures 24 formed in strut 18. In one embodiment, notches 59 (FIGS. 2 and 5) are provided in collars 58 for enabling access to fasteners 23 when swivel 20 is assembled. In this manner, fasteners 23 can be inserted into and removed from apertures 22 when swivel joint 20 is assembled. Further, it is noted that any suitable means can be utilized to secure swivel joint 20 to table 12 and strut 18. For instance, apertures similar to apertures 13 can be formed in strut 18 for inserting fasteners through strut 18 and into swivel 20. Further, apertures similar to apertures 22 can be formed in swivel 20 for securing swivel 20 to table 12.

Referring to FIG. 2, swivel joint 20 is rotatable about two axes of rotation, 27 and 28. In one embodiment, swivel 20 allows rotation simultaneously about axes 27 and 28 through angles greater than +/−20°; however other ranges can be provided depending on the desired application.

Figure 3:
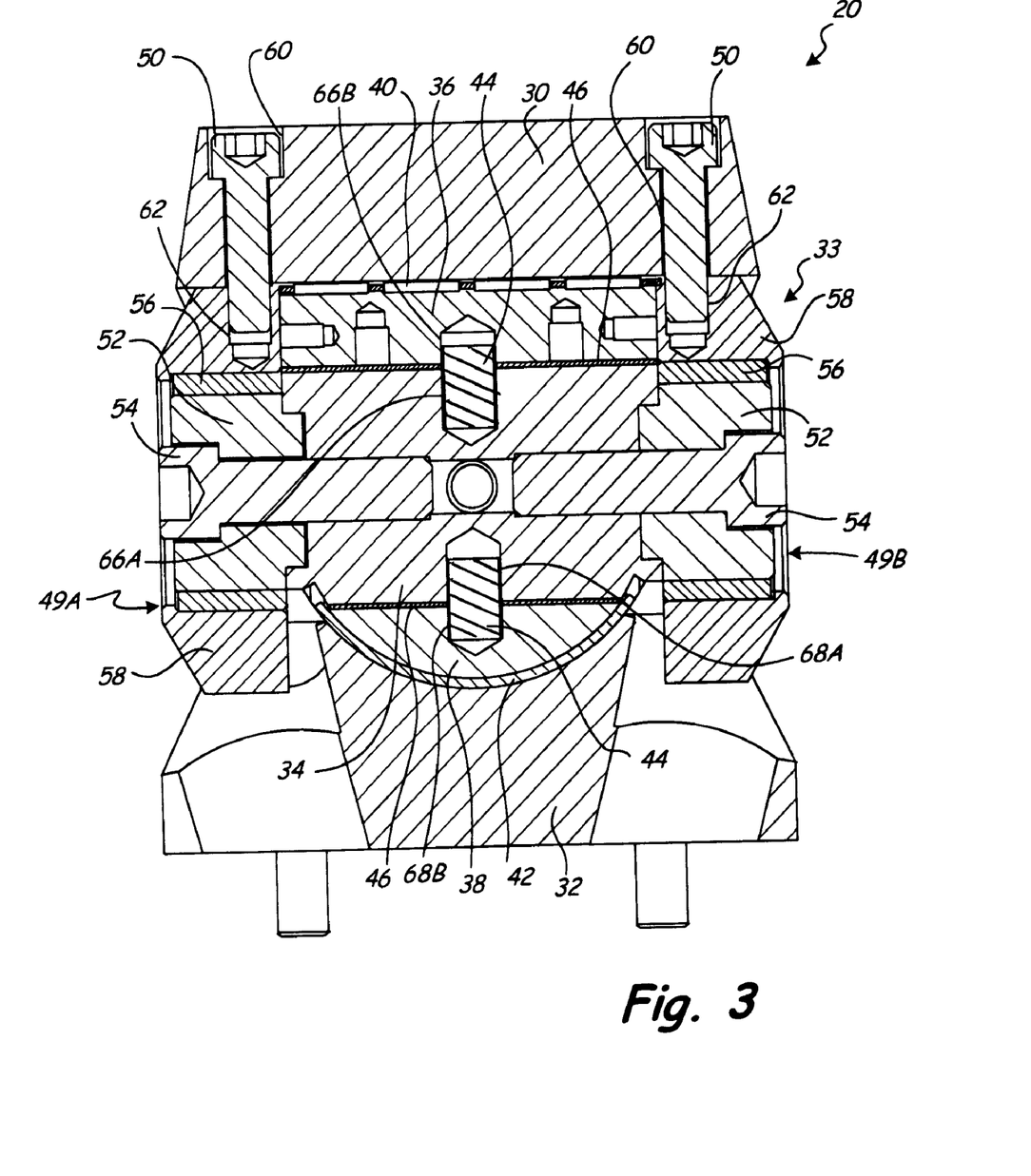
FIG. 3 is a cross-sectional view of the swivel joint of FIG. 2.
Figure 4:
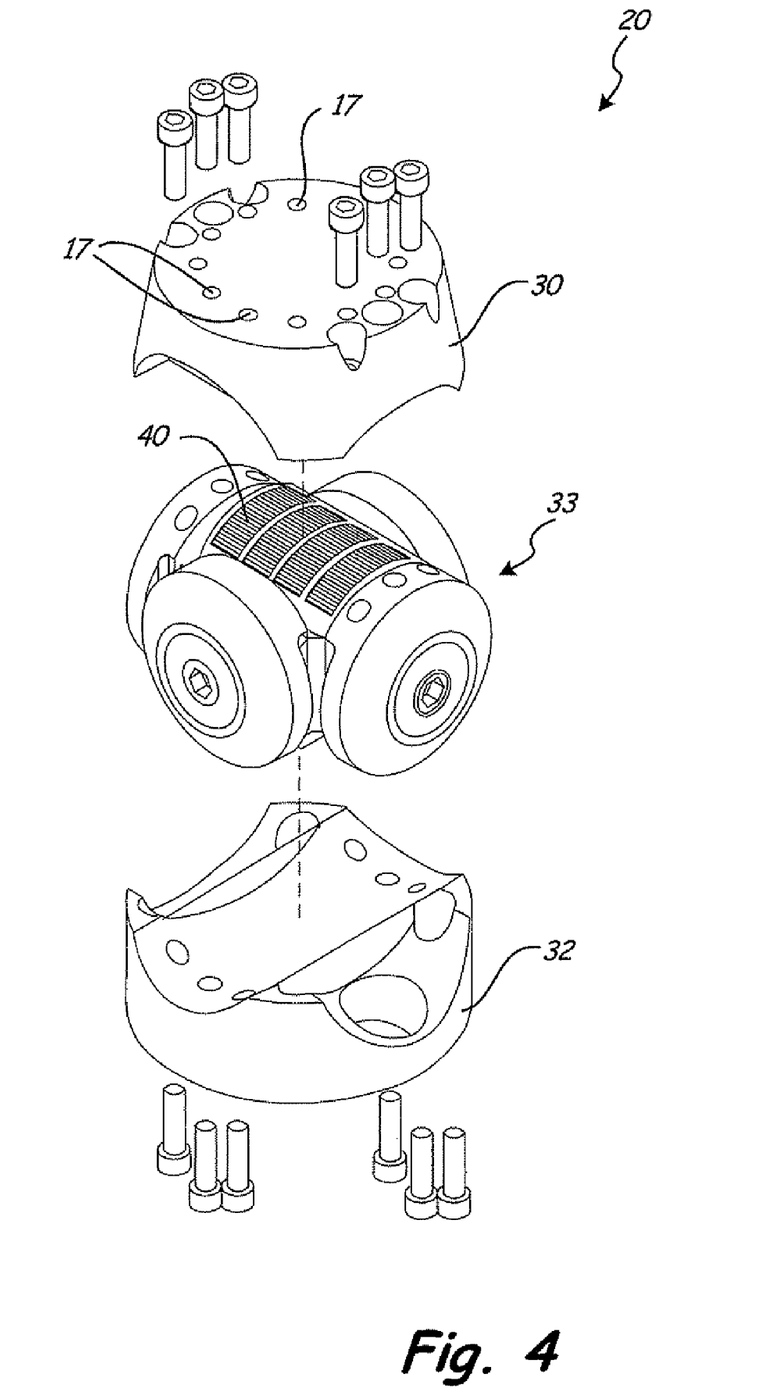
FIG. 4 is a partially exploded view of a swivel joint in accordance with one embodiment.

FIG. 3 is a cross section of the swivel joint 20 illustrated in FIG. 2 taken at line 3-3. In the embodiment illustrated in FIG. 3, swivel joint 20 comprises first and second base members 30 and 32 and a spider 33 positioned between the first and second base members 30 and 32. The spider 33 includes a center support 34 and first and second bearing support elements 36 and 38. Each bearing support element 36, 38 includes an arcuate surface 37, 39, respectively, adapted to form a movable joint with first and second base members 30, 32, respectively.

Referring also to FIG. 5, connector assemblies 49A, 49B, 49C, and 49D join base members 30,32 to center support 34. In particular, first and second connector assemblies 49A and 49B connect the center support 34 to the first base member 30 such that the first base member 30 is rotatable with respect to the center support 34 about axis 27, while third and fourth connector assemblies 49C and 49D connect the center support 34 to the second base member 32 such that the second base member 32 is rotatable with respect to the center support 34 about axis 28. As described below, each of the connector assemblies 49A-49D is supported on at least one of the shafts 52. In the embodiment illustrated in FIG. 5, shafts 52 comprise a plurality of cantilevered cylindrical shafts supported by center support 34. In some embodiments, the center support 34 and shafts 52 are integral being formed of a single unitary body.

In the embodiment illustrated in FIG. 5, connector assemblies 49A and 49B connect the first base member 30 with the center support 34 using fasteners 50. Each connector assembly 49A and 49E comprises a collar 58 rotatably supported on a shaft 52 by a bearing assembly 56. Fasteners 54 secure the shafts 52 to support 34 while fasteners 50 are inserted into apertures 60 formed in the base member 30 and engage apertures 62 formed in collars 58. Bearings 56 provide suitable assemblies for rotation of collars 58. Bearings 56 can be any suitable configuration such as, but not limited to, parallel needle rollers. As those skilled in the art will recognize, alternative bearing assemblies such as hydrostatic bearings, balls, or the like, can also be used in place of bearing assemblies 56 herein illustrated.

Fasteners 54 are received in apertures 55 of center support 34. In one embodiment, fasteners 54 are bolts that are received by threaded apertures 55. Further, in one embodiment, each shaft 52 includes a pilot 57 that extends toward the center support 34. Center support 34 includes corresponding apertures 35 configured to received pilots 57. Pilots 57 and apertures 35 provide a connection between shafts 52 and center support 34 that inhibits vertical movement (i.e., shear) of shafts 52 with respect to support 34.

Fasteners 50, herein illustrated as a pair of bolts, draw their respective collars 58, and thus connector assemblies 49A and 49B, towards base member 30, providing a compressive force between base member 30 and center support 34. The force created is preferably at a level greater than the force that results at that location from a maximum tension force expected to be placed on swivel joint 20. Base member 32 and connector assemblies 49C and 49D (shown in FIGS. 4 and 5) are similar to base member 30 and connector assemblies 49A and 49B such that fasteners 50, along with connector assemblies 49C and 49D, providing a compressive force between base member 32 and center support 34.

Bearing support elements 36 and 38 are configured to provide bearing support surfaces for the base members 30 and 32, respectively. In one embodiment, arcuate surfaces 37 and 39 of bearing support elements 36 and 38 directly support partial rotation of the first and second base members 30 and 32 with respect to the center support 34. In one embodiment, each arcuate surfaces 37,39 comprises a hydrostatic bearing surface for supporting base members 30, 32, respectively. In another embodiment, bearing support elements 36 and 38 are configured to support bearing assemblies positioned between bearing support elements 36 and 38 and the first and second base members 30 and 32. In the embodiment illustrated, a first bearing assembly 40 is positioned between the first base member 30 and arcuate surface 37, while a second bearing assembly 42 is positioned between the second base member 32 and arcuate surface 39. Bearing assemblies 40 and 42 can be any suitable configuration such as, but not limited to, parallel needle rollers. As those skilled in the art will recognize, alternative bearing assemblies such as hydrostatic bearings, other rolling elements such as balls, or the like, can also be used in place of bearing assemblies 40 and 42 herein illustrated.

Further, in the embodiment illustrated bearing cages 41 and 43 are utilized and are shaped similar to arcuate surfaces 37 and 39, respectively. Bearing cages 41 and 43 are disposed between arcuate surfaces 37 and 39 and base members 30 and 32, respectively. Bearing assemblies 40 and 42 are retained in bearing cages 41 and 43. At least one set of bearings are positioned on each arcuate surface 37 and 39. In the embodiment illustrated, four sets of bearings are positioned on each arcuate surface 37 and 39. Bearing assemblies 40 and 42, herein illustrated as parallel needle rollers, provide suitable assemblies for rotation of base members 30 and 32 along arcuate surfaces 37 and 39.

In any of the embodiments described herein, at least one shim 46 can be positioned between the arcuate surfaces 37 and 39 and the center support 34. As discussed below, use of shims 46 is advantageous to establish clearance between components in swivel joint 20 such that a desired preload force is achieved when fasteners 50 are tightened.

In the illustrated embodiment, bearing support elements 36 and 38 include arcuate surfaces 37 and 39 that are shaped substantially cylindrical, which herein includes cylindrical. Nevertheless, material deformation in some cases may cause uneven coupling between arcuate surfaces 37 and 39 and base members 30 and 32. As such, bearing support elements 36 and 38 can include a slight taper at each end to even coupling contact between surfaces 37 and 39 and corresponding base members 30 and 32 when assembled.

In one embodiment, center support 34 has opposed major surfaces that have substantially planar portions. Further, each bearing support element 36 and 38 includes a surface that has substantially planar portions that are adapted to engage one of the major surfaces of the center support 34. For instance, in one embodiment center support 34 includes a substantially flat first surface 67 facing upper bearing support element 36. Upper bearing support element 36 can also be configured to include a substantially flat surface (not shown) that is adapted to engage the surface 67. In another embodiment, center support 34 includes a substantially flat second surface (not shown) facing lower bearing support element 38. Similarly, lower bearing support element 38 can also be configured to include a substantially flat surface 69 that is adapted to engage the substantially flat surface of center support 34. While center support 34 is illustrated as substantially square, it is noted that center support 34 can be any suitable shape such as, but not limited to, rectangular, circular, elliptical, etc. Further, center support 34 can be symmetrical or asymmetrical.

In one embodiment, spider 33 includes at least one aligning device configured to align a bearing support element (36,38) and/or a shim 46 (if present) with the center support 34. Further, the at least one aligning device is configured to react lateral forces applied to the respective bearing support element (36,38). For instance, when swivel joint 20 is deflected to some extent (i.e., rotated about axes 27 and/or 28), a portion of the axial load can create a shearing force between at least one of the bearing support elements (36,38) and the center support 34. In this manner, the at least one aligning device operates as a shear key to prevent lateral movement of the respective bearing support element (36,38) with respect to the center support 34. Stated another way, tension on a top mounting surface of base member 30 when joint 20 is deflected to an angle about axis 27 (and/or 28) results in an upward force on shafts 54 at a corresponding deflection angle. A component of that force proportional to the sine of the deflection angle will try to shear the center support 34 relative to the bearing support element along the plane of the shim. The aligning device augments the friction resistance of this joint. It is also noted that in some embodiments of joint 20 movement of the bearing support element along the orthogonal axis can be constrained by collars 58.

For example, a suitable aligning device includes protrusions and corresponding apertures formed on the center support 34, bearing support elements 36,38 and/or shims 46. In the exemplary embodiment illustrated in FIG. 3, the at least one aligning device comprises locating pins. One locating pin 44 is inserted into an aperture 66A in center support 34 and an aperture 66B in a bottom surface of bearing support element 36. Similarly, a second pin 44 can be inserted into a second aperture 68A in a bottom surface of center support 34 and an aperture 68B in bearing support element 38.

As described above, connector assemblies 49A, 49B, 49C and 49D along with fasteners 50, couple center support 34 to their respective base members 30 and 32. Coupling of center support 34 with base members 30 and 32 creates a direct (axial) primary load path from base member 30 through bearing support element 36, center support 34, bearing support element 38, and into base member 32, and vise-versa. Presence of the primary load path allows high compressive forces to be placed on swivel joint 20, while swivel joint 20 remains rigid in an axial direction. In addition, a secondary load path exists from the base member 30 through connector assemblies 49A and 49B, center support 34, connector assemblies 38C and 38D, and into base member 32. This secondary load path is less rigid than the primary load path. However, the secondary load path preloads the primary load path so the primary load path can handle external tension forces placed on swivel joint 20 in a rigid manner.

Construction of the individual components of swivel joint 20 can be provided in order to establish clearance between components such that a desired preload force is achieved when the components are assembled. For example, a gap can be produced between engaging surfaces of the collars 58 and their respective base members 30 and 32 to create a desired preload force from fasteners 50 upon assembly. In one embodiment, shims elements are used to adjust the gap. In the embodiment illustrated, a first shim element 46 is positioned between the first bearing support element 36 and center support 34, and a second shim element 46 is positioned between the second bearing support element 38 and the center support 34. As appreciated by those skilled in the art, one or more shims can be used in one or both locations.

The dimensions of shims 46 (i.e., thickness) and their number can be adjusted based on the desired preload forces. In order to transmit tension forces effectively without backlash, the compressive force between the base members 30 and 32 and spider assembly 33 is preferably at least 500 pounds. In another embodiment, the compressive force is at least 1,000 pounds. In a further embodiment, the compressive force is at least 5,000 pounds. In yet a further embodiment, the compressive force is at least 25,000 pounds.

It is noted that other means can be utilized to create a gap between collars 58 and their respective base member. For example, shims can be positioned in alternate locations such as, but not limited to, engaging collars 58. Additionally, in some embodiments bearing assemblies 40 and 42 can be configured to include larger bearing elements to increase the gap between base members 30 and 32 and their respective connector assemblies (49A and 49B) and (49C and 49D). Further, in some embodiments, shafts 52 can be adjusted to shift connector assemblies 49A-49D with respect to center support 34 and create a gap between collars 58 and their respective base members.

Figure 6:
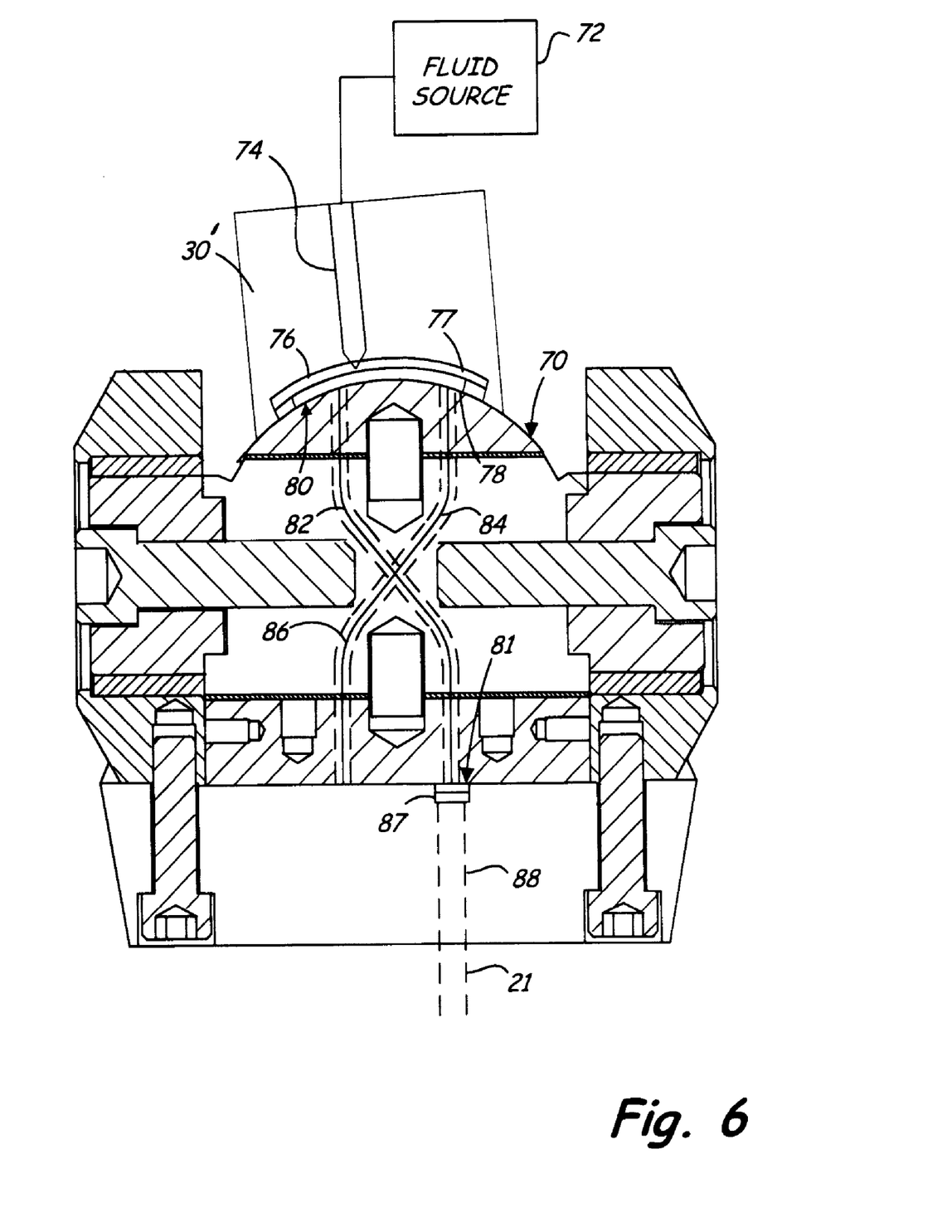
FIG. 6 is a side view of a swivel joint in accordance with one embodiment.
Figure 7:
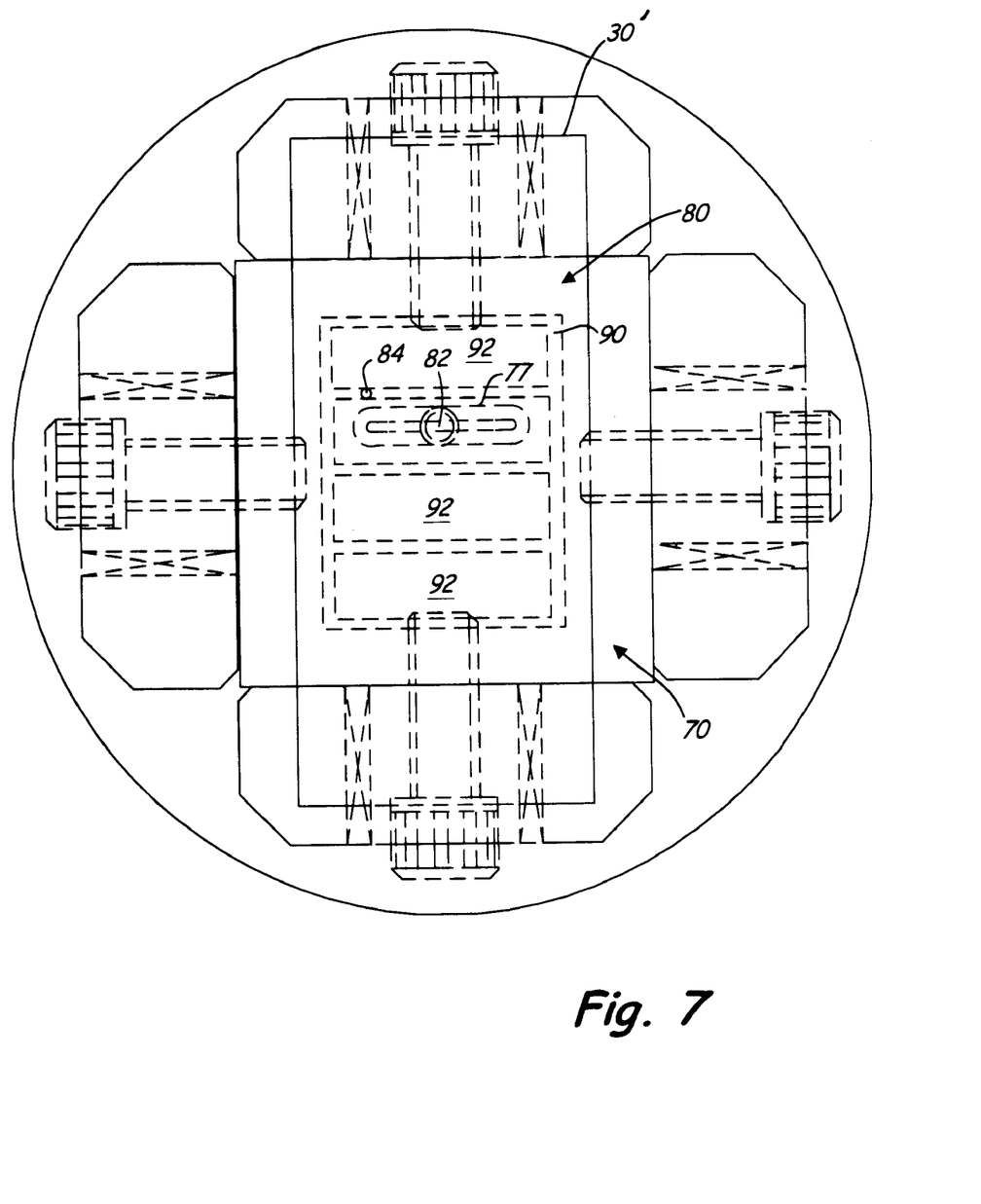
FIG. 7 is a top plan view of the swivel joint of FIG. 6.

FIGS. 6-7 illustrate an embodiment of a swivel joint in which hydrostatic bearings are utilized. Fluid source 72 is in fluid communication with a port 74 in base member 30'. Port 74 provides fluid to a commutator 76. Commutator 76 includes a seal 77 in order that fluid passes to spider 70 without leaking to hydrostatic bearings 80 and 81 and, in the embodiment illustrated, a friction reducing member 78. Commutator 76 is adapted to be in fluid communication with a central port 82 in spider 70. Auxiliary ports 84 and 86 carry fluid from central port 82 to bearings 80 and 81. Commutator 76 minimizes the number of external connectors in order to provide fluid to the hydrostatic bearing elements. Although, if desired, separate fluid couplings can be provided for each of the base members.

Fluid can also pass through central port 82 to commutator 87, which is constructed similar to commutator 76, but orthogonally oriented relative thereto. Commutator 87 allows fluid communication to a port 88. In this manner, port 88 can be in fluid communication with another swivel 20 through passageway 21 in strut 18 such as illustrated in FIG. 1. This eliminates separate hoses for each of the swivels 20.

By way of example, bearing 80 is illustrated in FIG. 7. Fluid is delivered to bearing 80 through auxiliary port 84. A channel 90 is recessed in base member 30' to provide fluid communication to bearing 80. Channel 90 forms pads 92. Although the number of pads herein illustrated is four, any number of pads can be used. As fluid collects in channel 90, fluid pressure develops in channel 90 and eventually leaks to pads 92. Fluid pads 92 creates a suitable bearing surface for rotation between base member 30' and spider 70 and also creates a squeeze film to minimize backlash in swivel 20 when compression and tensile forces are applied.

The preload forces between the spider 33 and the base members 30' and 32' can be achieved through use of spring elements. The spring elements, as discussed earlier, create two load paths. A working load path (primary) is established by coupling arcuate surfaces 37 and 39 to respective base members 30' and 32'. This is a rigid load path that handles compressive forces. The preload or secondary load path is transferred through spring elements to provide a compressive preload for the working load path. The secondary load path is more compliant than the rigid working path. The preload path allows the rigid working load path to maintain coupling of arcuate surfaces 37 and 39 to respective base members 30' and 32' in the presence of external tension loads placed on swivel 20.

The spring elements can take many forms. FIGS. 8-11 schematically illustrate alternative embodiments of a spring element that provides a preload force between the spider and a base member of a clevis. In each of the following figures, only one half of the joint is illustrated.

Figure 8:
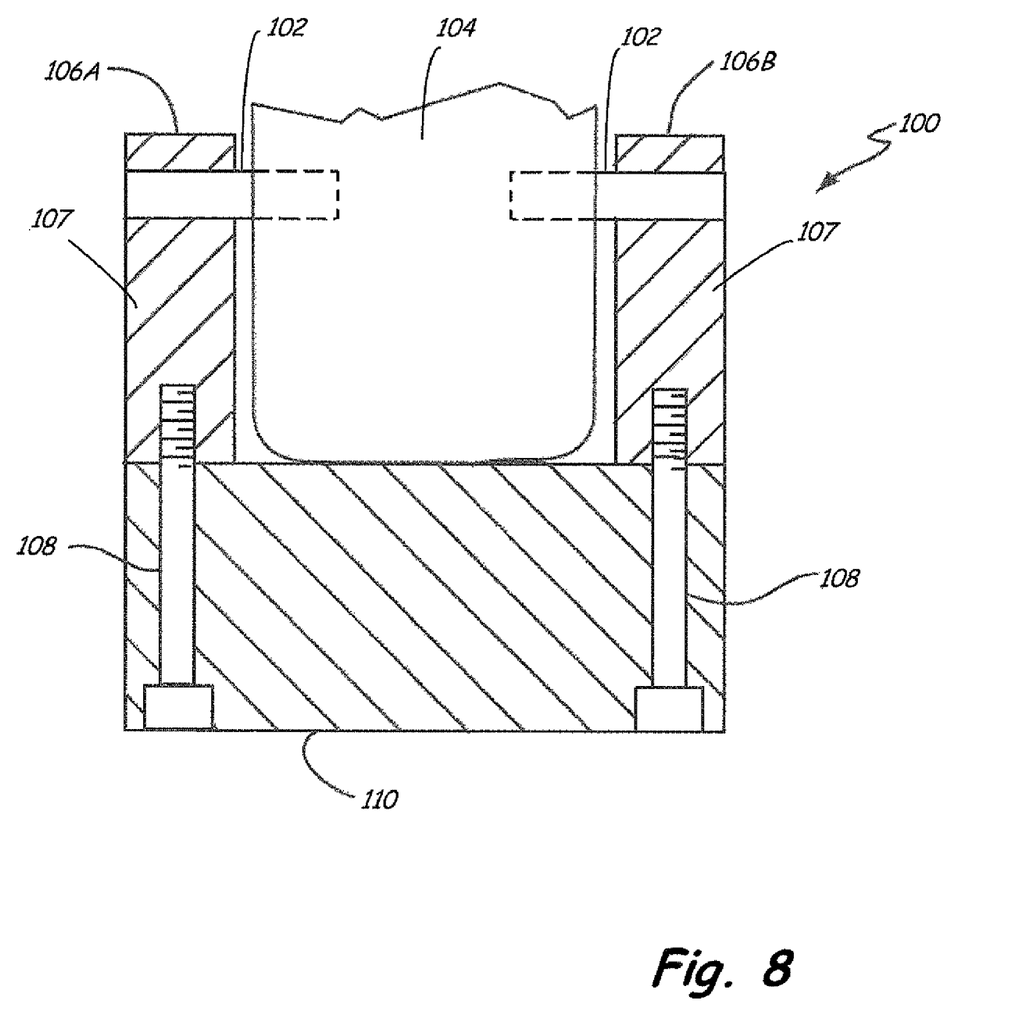
FIGS. 8-11 are schematic illustrations of alternative embodiments of a swivel joint.

FIG. 8 illustrates swivel 100 including spring elements 102. As illustrated, spring elements 102 are pins extending from or to a center support 104. The spring elements 102 extend into collars 107 of connector assemblies 106A and 106B. Fasteners 108 draw connector assemblies 106A and 106B towards base member 110. This causes a bending moment in spring elements 102. If desired, connector assemblies 106A and 106B can include enlarged apertures to provide clearance for the bending spring elements 102.

Figure 9:
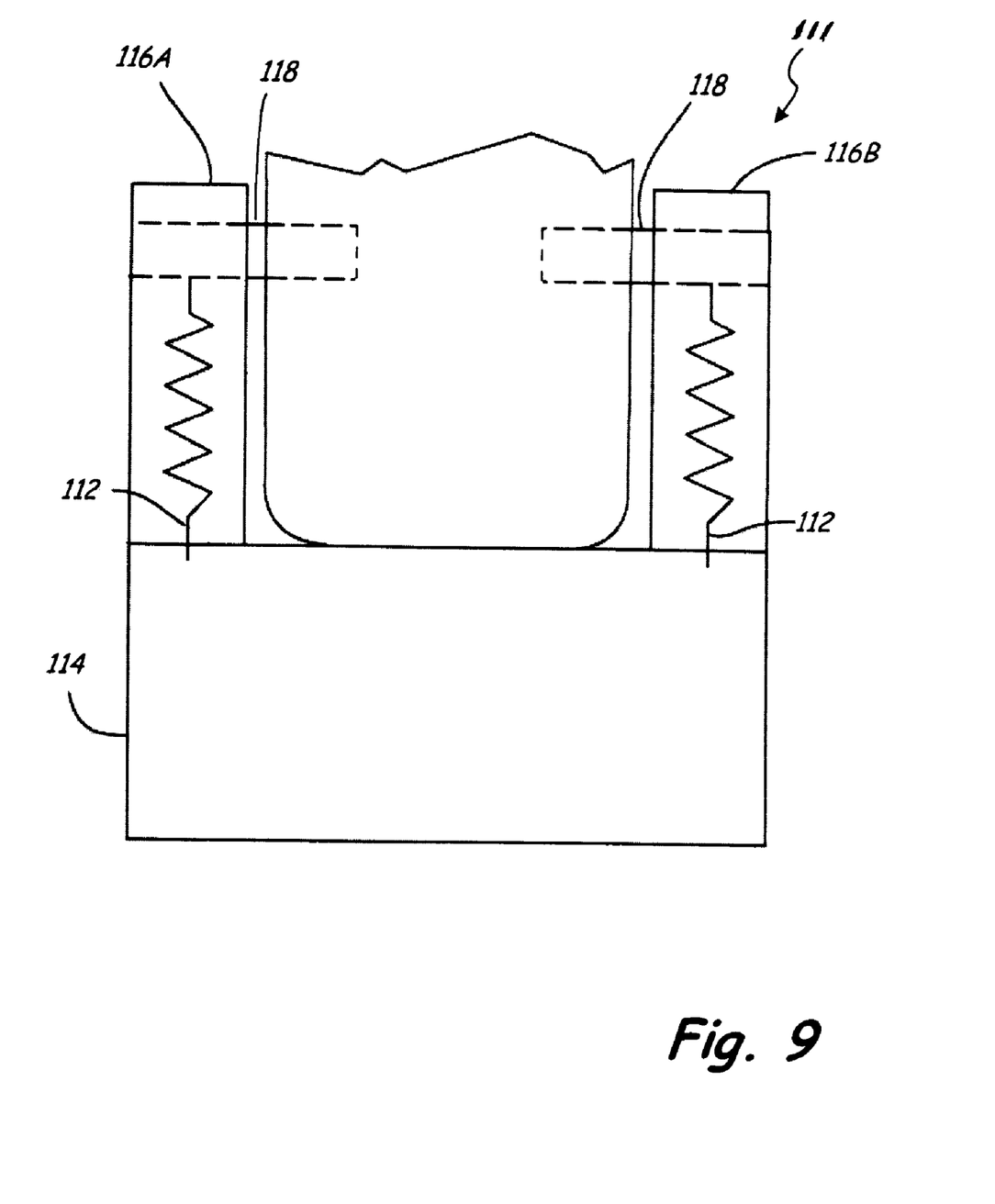

In FIG. 9, a swivel joint 111 includes spring elements 112 that are compliant and draw base member 114 towards connector assemblies 116A and 116B. In this case, pin portions 118 are more rigid than spring elements 112. As desired, spring elements 112 could be fasteners, retainers or any other element to provide a preload force. Depending on the material used for fasteners 54, shafts 52, or fasteners 50 and 51, the swivel joint 20 can operate according to the principles of FIGS. 8 and 9 individually or in combination.

Figure 10:
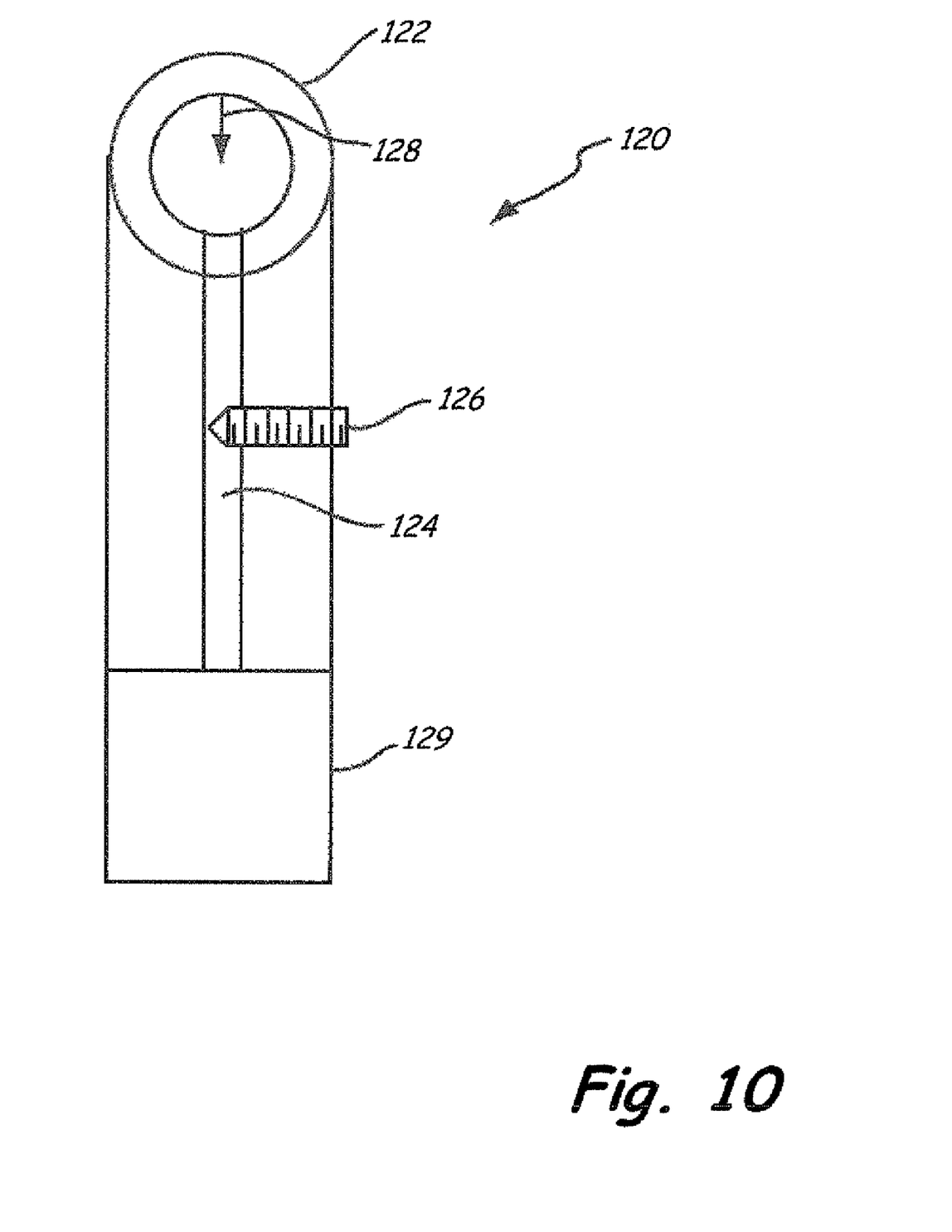

In yet another embodiment, FIG. 10 illustrates a side view of swivel joint 120 having a connector assembly 122 that is a spring element. A similar construction would be provided on the other side. In this case, connector assembly 122 includes a slot or gap 124. Element 126, herein a bolt, can be provided to increase the width of slot 124, which provides a force in the direction of arrow 128, which forces connector assembly 122 towards base element 129.

Figure 11:
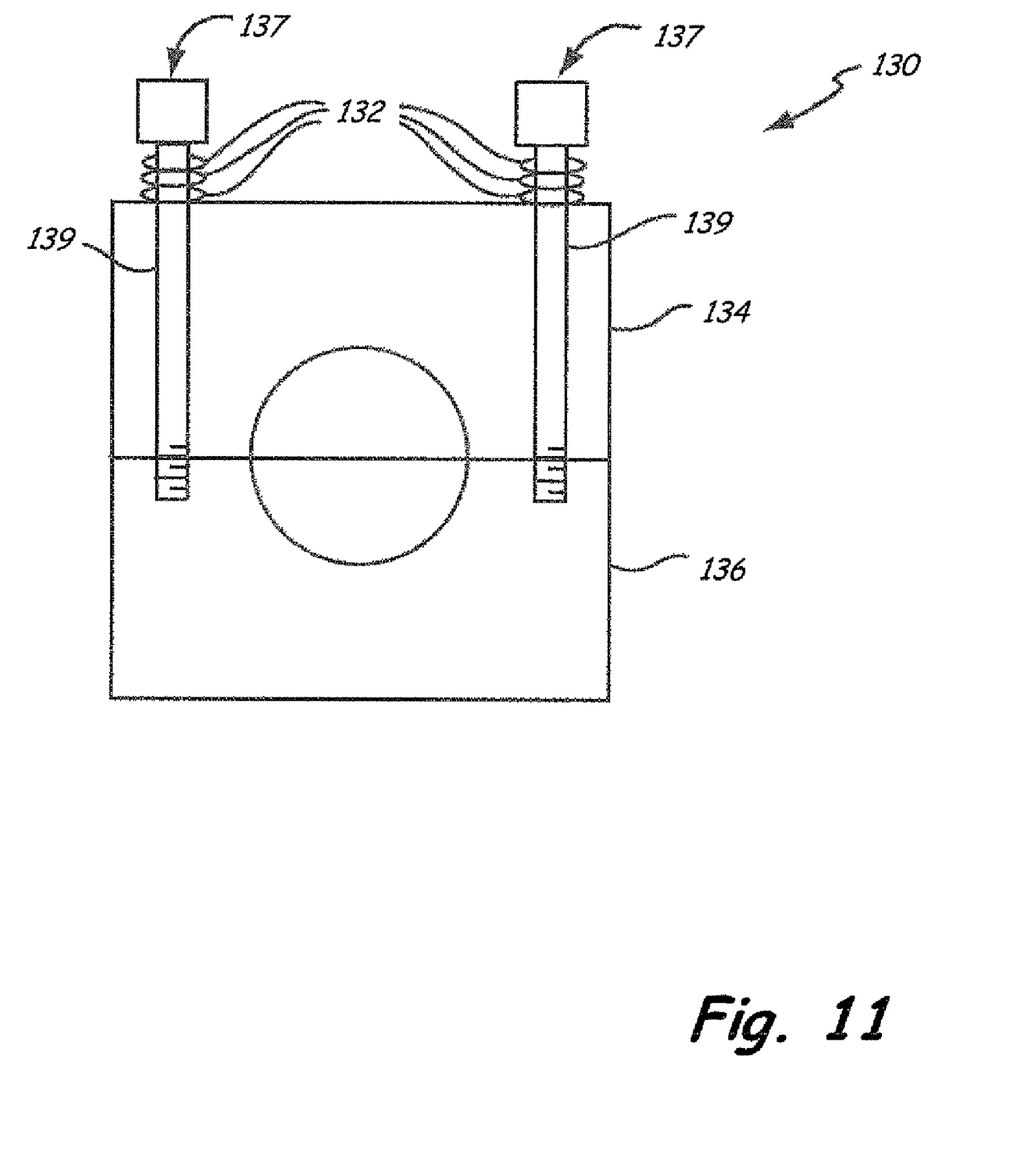

Compressive spring forces may also be used. In FIG. 11, swivel joint 130 includes a spring element 132 forcing an upper retainer element 134 towards a lower retainer element 136, which is in this case integral with a base member. For example, each fastener 137 can include a bolt 139 inserted through an external spring element 132 (herein a spring washer stack), the bolt 139 extending through an upper retainer element 134 and threaded into a lower retainer element 136. External spring element 132 can also be a coil spring or other external spring element. FIG. 11 illustrates one side of one half of the swivel joint 130. A similar construction would be provided for each side portion of the joint.

Although the subject matter has been described in language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims and can be varied in a number of ways within the scope of the claims.

What is claimed is:

1. A swivel joint comprising:
   first and second base members;
   a spider positioned between the first and second base members, the spider comprising:
      a center support having at least two surfaces that have substantially planar portions that are opposed from each other; and
      first and second bearing support elements, wherein each bearing support element has an arcuate surface, and wherein each bearing support element includes a surface that has a substantially planar portion that faces one of the planar surfaces of the center support;
      two bearing assemblies, wherein a bearing assembly operably engages each arcuate surface and corresponding base member to form a joint; and
      at least one planar shim element positioned between one of the bearing support elements and the center support to control a distance between the one of the bearing support elements and the center support.

2. The swivel joint of claim 1 wherein the center support has a plurality of shafts, wherein a first pair of shafts are aligned with each other and face in opposite directions, and wherein a second pair of shafts are aligned with each other and face in opposite direction, wherein the first pair of shafts are orthogonal to the second pair of shafts; and wherein the spider includes first and second connector assemblies connecting the center support to the first base member such that the first base member is rotatable with respect to the center support about a first axis of rotation, and third and fourth connector assemblies connecting the center support to the second base member such that the second base member is rotatable with respect to the center support about a second axis of rotation, wherein each of the connector assemblies is supported on at least one of the shafts.

3. The swivel joint of claim 2 wherein the center support and the shafts are integral being formed of a single unitary body.

4. The swivel joint of claim 2 and further comprising a plurality of fasteners, wherein each fastener joins one of the shafts to the center support.

5. The swivel joint of claim 4 wherein each of the shafts includes a pilot extending toward the center support, and wherein the center support includes a plurality of apertures, each aperture receiving one of the pilots.

6. The swivel joint of claim 5 wherein each of the shafts are joined to the center support and wherein each connector assembly comprises a collar rotatably supported on one of the shafts, and wherein the collars are attached to one of the first and second base members.

7. The swivel joint of claim 6 wherein each connector assembly comprises a bearing assembly disposed between the collar and the shaft.

8. The swivel joint of claim 2 wherein the first and second connector assemblies each comprise a first spring element and the third and fourth connector assemblies each comprise a second spring element.

9. The swivel joint of claim 2 wherein the at least one shim element is disposed between the first bearing support element and the center support and a second shim element is disposed between the second bearing support element and the center support.

10. The swivel joint of claim 9 and further comprising a first aligning device aligning the first bearing support element with the center support and a second aligning device aligning the second bearing support element with the center support.

11. The swivel joint of claim 10 wherein the first aligning device comprises a locating pin and the at least one shim element includes an aperture configured for receiving the locating pin.

12. The swivel joint of claim 2 wherein each of the shafts includes a pilot extending toward the center support, and wherein the center support includes a plurality of apertures, each aperture configured to receive one of the pilots.

13. The swivel joint of claim 2 wherein the first and second bearing assemblies comprise rolling elements.

14. The swivel joint of claim 2 wherein the first and second bearing assemblies are hydrostatic.

15. The swivel joint of claim 2 wherein each connector assembly includes a collar engaged to one of the first and second base member, each collar being supported on one of the shafts by a bearing assembly.

16. The swivel joint of claim 1 wherein a first shim element is positioned between the first bearing support element and the center support and a second shim element is positioned between the second bearing support element and the center support.

17. The swivel joint of claim 1 and further comprising a first aligning device aligning the first bearing support element with the center support and a second aligning device aligning the second bearing support element with the center support.

* * * * *